United States Patent
Lovegrove

(10) Patent No.: US 11,046,606 B2
(45) Date of Patent: Jun. 29, 2021

(54) DRINKING BOTTLE

(71) Applicant: ICON LIFESAVER LIMITED, Colchester (GB)

(72) Inventor: Joseph Lovegrove, Colchester (GB)

(73) Assignee: ICON LIFESAVER LIMITED, Colchester (GB)

(*) Notice: Subject to any disclaimer, the term of this patent is extended or adjusted under 35 U.S.C. 154(b) by 0 days.

(21) Appl. No.: 16/467,269

(22) PCT Filed: Dec. 7, 2017

(86) PCT No.: PCT/GB2017/053682
§ 371 (c)(1),
(2) Date: Jun. 6, 2019

(87) PCT Pub. No.: WO2018/104737
PCT Pub. Date: Jun. 14, 2018

(65) Prior Publication Data
US 2019/0300413 A1 Oct. 3, 2019

(30) Foreign Application Priority Data
Dec. 7, 2016 (GB) ..................................... 1620769

(51) Int. Cl.
*C02F 9/00* (2006.01)
*A45F 3/18* (2006.01)
(Continued)

(52) U.S. Cl.
CPC ................ *C02F 9/005* (2013.01); *A45F 3/18* (2013.01); *B01D 61/027* (2013.01); *B01D 63/04* (2013.01);
(Continued)

(58) Field of Classification Search
CPC ... A45F 2003/163; A45F 3/18; B01D 61/027; B01D 63/04; B01D 69/08; C02F 1/002;
(Continued)

(56) References Cited

U.S. PATENT DOCUMENTS 2,670,081 A 2/1954 Quinn
5,106,500 A * 4/1992 Hembree ............. B01D 29/117
210/266

(Continued)

FOREIGN PATENT DOCUMENTS

CN 103 056 997 4/2013
CN 104226114 12/2014
(Continued)

OTHER PUBLICATIONS

Official Communication issued in International Bureau of WIPO Patent Application No. PCT/GB2017/053682, dated Mar. 8, 2018.

*Primary Examiner* — Terry K Cecil
(74) *Attorney, Agent, or Firm* — Greenblum & Bernstein, P.L.C.

(57) ABSTRACT

The present invention is directed to a water container. The water container comprises a fluid path defined by a rigid fluid reservoir, a filter and a water outlet having an open position and a closed position; a fluid inlet, and a pump coupled to the fluid inlet. The pump comprises a non-return valve and a piston shaft through which a piston head may be moved, the piston head being coupled to a piston rod slidably moveable through an orifice at a first end of the piston shaft, wherein the orifice is sealed about the piston rod such that, in use, operation of the pump pumps fluid from a fluid source in communication with the fluid inlet, through the non-return valve and into the fluid reservoir so as to pressurise the fluid reservoir such that, when the water outlet is in the open position, a pressure differential induces
(Continued)

a flow of water along the fluid path through the filter to the water outlet. The piston shaft is substantially surrounded by the filter.

24 Claims, 8 Drawing Sheets

(51) Int. Cl.
*B01D 61/02* (2006.01)
*B01D 63/04* (2006.01)
*B01D 69/08* (2006.01)
*A45F 3/16* (2006.01)
*C02F 1/00* (2006.01)
*C02F 1/28* (2006.01)
*C02F 1/44* (2006.01)
*C02F 1/50* (2006.01)
*C02F 101/20* (2006.01)

(52) U.S. Cl.
CPC ........ *B01D 69/08* (2013.01); *A45F 2003/163* (2013.01); *C02F 1/002* (2013.01); *C02F 1/283* (2013.01); *C02F 1/442* (2013.01); *C02F 1/50* (2013.01); *C02F 2101/20* (2013.01); *C02F 2201/003* (2013.01); *C02F 2201/005* (2013.01); *C02F 2201/006* (2013.01); *C02F 2209/03* (2013.01); *C02F 2303/04* (2013.01); *C02F 2307/02* (2013.01)

(58) Field of Classification Search
CPC .......... C02F 1/003; C02F 1/283; C02F 1/442; C02F 1/50; C02F 2101/20; C02F 2201/003; C02F 2201/005; C02F 2201/006; C02F 2209/03; C02F 2303/04; C02F 2307/02; C02F 9/005
See application file for complete search history.

(56) References Cited

U.S. PATENT DOCUMENTS

| 5,534,145 | A | 7/1996 | Platter et al. |
| 9,637,396 | B2* | 5/2017 | Pritchard ............. B01D 63/025 |
| 2009/0173673 | A1 | 7/2009 | Pritchard |
| 2011/0233119 | A1 | 9/2011 | Nelson |
| 2011/0240703 | A1 | 10/2011 | Tobin et al. |
| 2012/0152844 | A1 | 6/2012 | Pritchard |

FOREIGN PATENT DOCUMENTS

| WO | 97/06879 | 2/1997 |
| WO | 2008/037969 | 4/2008 |
| WO | 2010/077805 | 7/2010 |
| WO | 2011/027125 | 3/2011 |
| WO | 2012/07185 | 6/2011 |
| WO | 2013/038178 | 3/2013 |
| WO | 2016/120646 | 8/2016 |

* cited by examiner

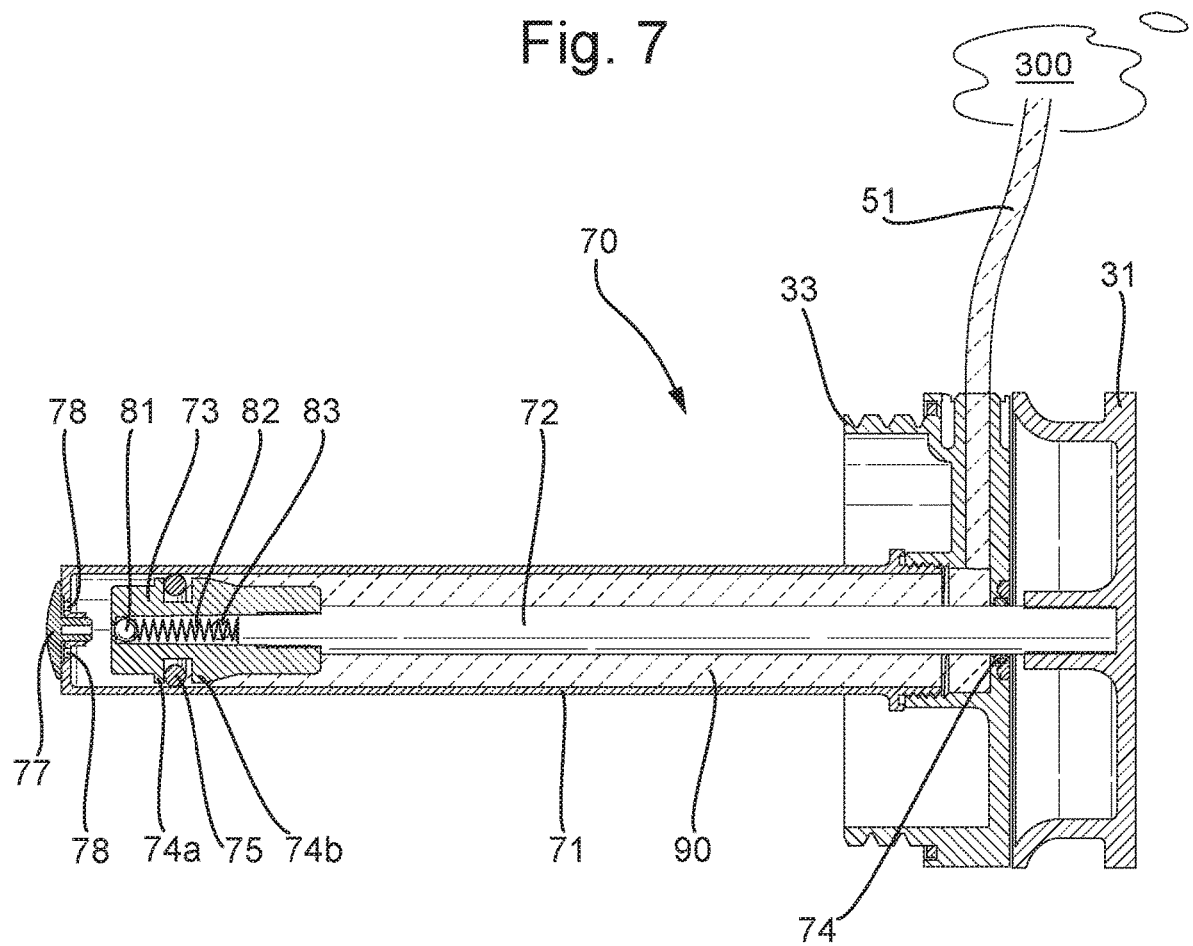

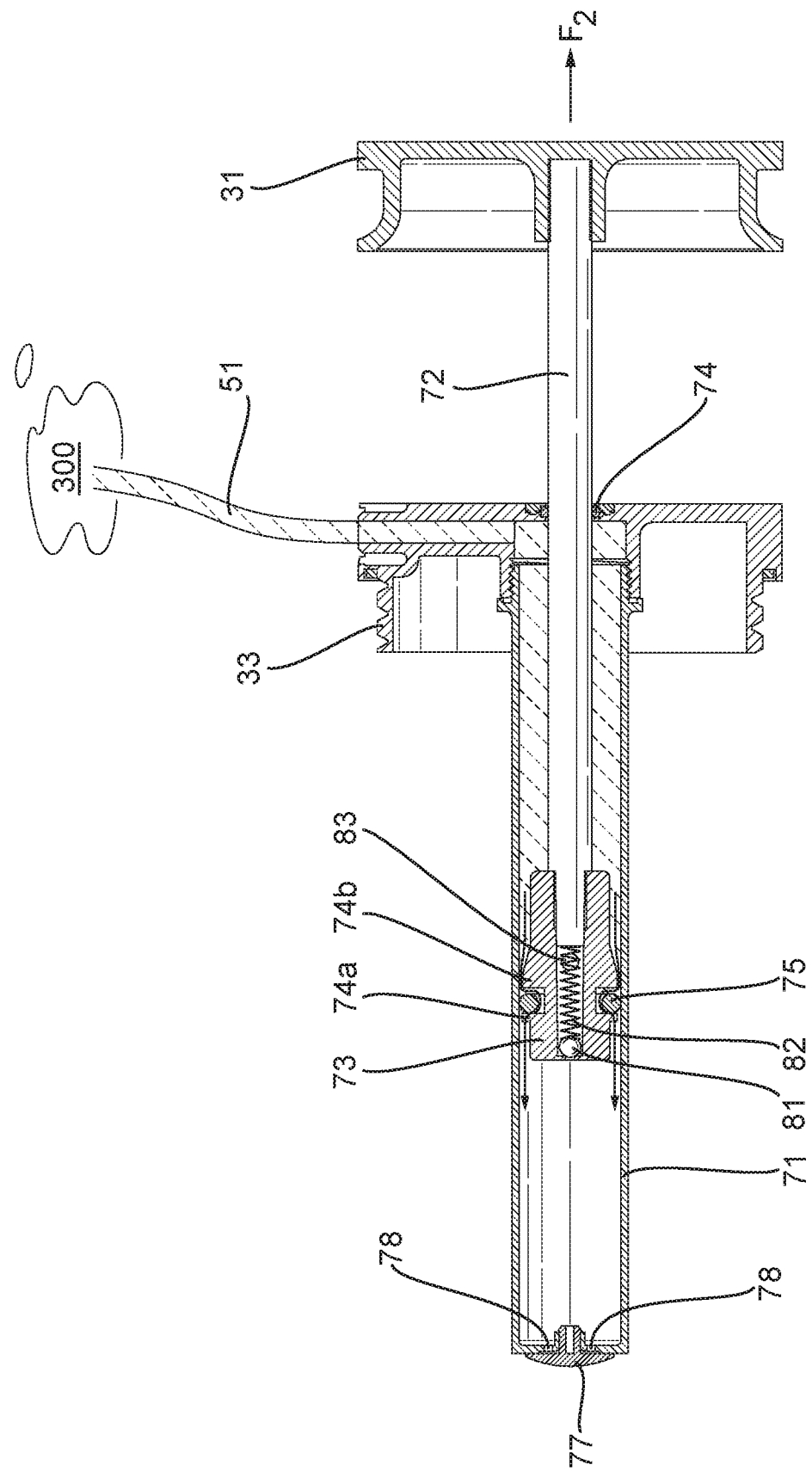

DRINKING BOTTLE

BACKGROUND TO THE INVENTION

In the absence of a ready source of drinking water, it is common for people to carry bottles or other receptacles containing potable water. Bottles are pre-filled so that the person can have access to safe drinking water. If instead a person chooses to drink the water from the surrounding environment they run the risk of being poisoned or struck down by disease through the ingestion of bacteria, cysts or viruses living naturally in the water.

International patent publications WO2008037969, WO2011027125, and WO2013038178 disclose water containers which include a filter module utilising hollow fibre membranes for filtering water under the action of an applied pressure differential. The pressure differential is achieved by pumping air into the container.

The philosophy behind this water filtration technology is that water should be collected in the container and stored 'dirty', and only filtered when actually dispensed for consumption. The containers disclosed in these publications have achieved considerable commercial success in the area of humanitarian relief.

For the consumer market, a more adaptable product is required that meets the needs of trekkers where there is usually some uncertainty over where the next water source can be found over the course of a trek.

SUMMARY OF THE INVENTION

In accordance with a first aspect of the invention, there is provided a water container comprising: a fluid path defined by a rigid fluid reservoir, a filter and a water outlet having an open position and a closed position; a fluid inlet, and; a pump coupled to the fluid inlet, wherein the pump comprises: a non-return valve, and; a piston shaft through which a piston head may be moved, the piston head being coupled to a piston rod slidably moveable through an orifice at a first end of the piston shaft, wherein the orifice is sealed about the piston rod such that, in use, operation of the pump pumps fluid from a fluid source in communication with the fluid inlet, through the non-return valve and into the fluid reservoir so as to pressurise the fluid reservoir such that, when the water outlet is in the open position, a pressure differential induces a flow of water along the fluid path through the filter to the water outlet, and wherein; the piston shaft is substantially surrounded by the filter.

The water container of the present invention is adaptable to meet the requirements of trekkers in a variety of scenarios. Advantageously, due to the presence of the water inlet and the orifice in the piston shaft being sealed about the piston rod, the water container is able to be used in two distinct modes as required by the user depending on his/her situation.

For example, if the user is on a trek in a remote environment and comes across a water supply such as a river or lake but is not sure where the next water supply will be found, the water container of the present invention can be used to continuously pump unclean water from the water supply through the filter and out of the water outlet in order to fill a secondary container with clean, potable water. This is done by ensuring that the water outlet is in an open position, presenting the fluid inlet to the dirty water supply and operating the pump. Operation of the pump draws water from the water supply into the rigid fluid reservoir, pressurising the fluid reservoir. This provides the required pressure differential for the water to pass along the fluid path, through the filter and out of the water outlet into the secondary container. Due to the driving of the water through the filter under pressure, the output water is filtered, clean and safe to drink. In this manner, the compact water container of the present invention can be used to efficiently fill a large container with enough safe potable water for the user to consume until he/she finds the next water supply.

In another scenario, a trekker may be in a less remote environment and can be certain that a water source can be found in short time frame. Such an example might be an afternoon walk in a country park after which the walker will return home. However, such a walk may still be strenuous and the walker may wish to frequently consume water. Instead of carrying around a large water container for this purpose which would be heavy and unwieldy, the water container of the present invention may be used instead. In this case, a user would change the water outlet of the water container to its closed position and pump water from a dirty water supply in to the fluid reservoir in the same manner as described above. However, due to the non-return valve and the closed position of the water outlet, the dirty water is stored in the rigid fluid reservoir until the user requires a drink. In order to filter and consume the water, the user would open the water outlet to its open position. The stored dirty water, which is stored under pressure in the reservoir due to it being pumped in to the reservoir where air is already present, would then flow along the fluid path, through the filter and out of the fluid outlet. If a greater pressure differential is required for the water to flow through the filter, the user would use the pump to pump air in through the fluid inlet into the fluid reservoir in order to provide the required pressure. If the user consumes the entirety of the stored water in the container, he/she can simply fill it up again. The water container can be filled by pumping water into the rigid fluid reservoir as described above, or alternatively dirty water may be introduced directly into the rigid fluid reservoir (for example by pouring water in or by "scooping" water directly from a water source using the water container). In such a case air will need to be pumped into the fluid reservoir in order to generate the required pressure differential.

As can be seen, the water container of the present invention is extremely adaptable and can be used for a variety of applications and potential scenarios. Advantageously, as the piston shaft is substantially surrounded by the filter, the water container is compact and easily portable.

The required pressure in the fluid reservoir so as to induce the flow of water along the fluid path is typically at least 0.25 bar, preferably 1.2 bar. The flow rate of water out of the water outlet may be 1 litre/minute.

Preferably the rigid fluid reservoir has a storage (i.e. internal) capacity of at least 300 ml, more preferably at least 450 ml. This advantageously provides for a compact water container which is highly adaptable as described above, yet one which beneficially holds a substantial amount of water ready to be filtered and drunk.

Typically, the fluid inlet is located in a side wall of the water container, and preferably comprises an orifice located in a side wall of the water container. This positioning of the fluid inlet allows for easy scavenging of water from a water source, as the location of the fluid inlet does not interfere with the actuation of the pump. Indeed, typically the fluid inlet is spaced apart from the pump.

Particularly beneficially, the fluid inlet may be attachable to a hose such that, in use, the fluid inlet is in communication with a fluid source by means of the hose. Advantageously, this feature allows a user to attach one end of a so-called "scavenging hose" to the fluid inlet, and present the opposing end of the hose to a water supply in order to draw water into the fluid reservoir. This allows for particularly easy utilisation of the water container.

The fluid inlet may further comprise a second non-return valve such that fluid located between the piston head and the fluid inlet does not flow back to the fluid source during operation of the pump. The inventors have found that when the water container is used to draw water from a water source into the fluid reservoir, the pressure provided by the water source (which is typically a much larger body of water than that in the container) prevents water from being pushed out of the fluid inlet back into the water source when the piston head is retracted through the piston shaft during operation of the pump. However, it is still envisaged that a non-return valve such as a duck-bill valve may be used at the water inlet.

Preferably, the rigid fluid reservoir comprises a removable base portion. This advantageously provides ease of access to the fluid reservoir such that a user is able to fill the rigid fluid reservoir by removing the base portion and introducing water to the fluid reservoir. It is envisaged that this mode of operation will be used with the water container acting as a water storage. In this case, in order to drive dirty water stored in the reservoir through the filter, the pump will need to be actuated in order to pump air into the fluid reservoir and increase the pressure within the fluid reservoir, as described above.

Preferably, the open and closed positions of the water outlet are actuated by a tap, although other means of opening and closing the water outlet are envisaged, for example a removable cap.

Advantageously, the water outlet may be attachable to a secondary container. This is particularly beneficial when the water container is being used to continuously pump and filter water into a secondary container, as described above. The water outlet may be attachable to a hose, which would allow the water container to be attached to a secondary container, for example a flexible bladder reservoir. Preferably the water outlet comprises a nozzle, which is particularly easy to attach to a hose.

The water container may further comprise a fixture for attaching to a secondary container such that, in use, water flowing through the water outlet enters the secondary container. This is particularly beneficial when the water container is being used to fill a secondary container as described above. Typically such a fixture is a screw thread, which allows the water container to be attached to a secondary container comprising a corresponding thread, for example a wide mouth Nalgene® bottle. In the case where the water outlet is attachable to a hose and the water container comprises a fixture for attaching to a secondary container, this further increases the adaptability of the invention as a wide variety of secondary containers may be efficiently filled.

The filter may comprise one or more membranes that are effective to pass water in preference to air under the influence of a pressure differential. Preferably, the one or more membranes comprise a plurality of pores having a mean size of less than 20 nanometres, preferably less than 15 nanometres. This advantageously means that the filter is capable of ultra-filtration. This ensures that viruses as well as bacteria are filtered from the water. The preferred membranes have a retention of greater than 99.9999% of bacteria, 99.99% of cysts and 99.99% of viruses. The membranes also remove sediments and all other deposits in suspension from the water.

Typically the filter comprises at least one hydrophilic capillary hollow fibre membrane. Preferably the filter comprises an array of such membranes. Dirty water stored in the reservoir is forced under a pressure differential through walls of the capillary hollow fibre membranes to respective open ends of the capillary fibre membranes. The capillary hollow fibre membranes may be potted at an open end to hold the open ends of the fibre membranes in a fixed relationship to each other.

The filter may comprise a filter cartridge comprising a plurality of fibre membranes, preferably hollow fibre membranes. Preferably, the filter cartridge is removable from the water container. This advantageously allows a "used" filter to be easily replaced by a user. One particular advantage of the use of such membranes is that eventually the pores in the membranes are filled with the deposits filtered from the water over time. When this occurs, water is no longer able to pass through the filter and the filter needs to be replaced. This not only provides a clear indication when to replace the filter, it also prevents a user from drinking unsafe water as the fluid path from the fluid reservoir to the water outlet would be blocked.

Such a filter cartridge typically comprises an annular housing having an outer wall comprising a plurality of holes therethrough in order to allow water to flow from the fluid reservoir through the holes to the filter membranes.

The filter and the piston shaft may be co-axial, that is, they share a common axis. This allows for a compact water container.

The fluid reservoir, the filter and the piston shaft may be substantially cylindrical and co-axial.

Typically, the water container further comprises a pressure regulator to prevent pressure in the fluid reservoir becoming too high. Preferably the pressure regulator comprises a valve adapted to prevent the pressure in the fluid reservoir being raised above a predetermined level. Such a valve may be positioned in the piston head for example.

The non-return valve of the pump is preferably an umbrella valve, although other non-return valves are envisaged.

The fluid path may comprise a secondary filter located between the filter and the water output. Such a secondary filter advantageously provides a further filtering process, for example removing chemicals and heavy metal contaminants from the water, and is typically a carbon filter. Preferably, such a secondary filter is removable from the water container, allowing it to be replaced. It is envisaged that the secondary filter is removable separately to the main filter, which advantageously prevents contamination of the main filter (for example by dirty fingers).

Typically, at least one of the rigid fluid reservoir and water outlet is made from plastic materials, preferably water-grade acrylonitrile butadiene styrene (ABS) or polypropylene. Preferably, the water outlet comprises an anti-microbial additive in order to restrict the growth of bacteria, fungi and mould. Typically, any feature of the water container that comes into contact with clean filtered water comprises such an anti-microbial additive.

In accordance with a second aspect of the invention, there is provided a water container comprising: a rigid container body having a closeable water outlet and a fluid inlet; a water filter housed within the container body and coupled to the water outlet; a pump housed within the container body and coupled to the fluid inlet, wherein the pump comprises:

a non-return valve, and; a piston shaft through which a piston head may be moved, the piston head being coupled to a piston rod slidably moveable through an orifice at a first end of the piston shaft, wherein the orifice is sealed about the piston rod such that, in use, operation of the pump pumps fluid from a fluid source in communication with the fluid inlet, through the non-return valve and into the container body so as to pressurise the container body such that, when the water outlet is in an open position, a pressure differential induces a flow of water from the container body through the water filter to the water outlet, and wherein; the piston shaft is substantially surrounded by the water filter.

The rigid container body preferably has an internal capacity of at least 300 ml, more preferably at least 450 ml.

In accordance with a third aspect of the invention there is provided a computer program product encoding 3D printing instructions to manufacture, using a 3D printer, the water container of the invention.

In accordance with a fourth aspect of the invention there is provided a computer program product encoding a computer model of the water container of the invention. A variety of 3D CAD file types may be used for such 3D printing and/or modelling, for example STEP files. The CAD file may be converted into instructions a 3D printer can action.

In accordance with a fifth aspect of the invention, there is provided a kit comprising a water container according to the invention, and a hose attachable to the fluid inlet.

BRIEF DESCRIPTION OF THE DRAWINGS

An example of the present invention will now be described with reference to the following drawings, in which:

FIG. 7 shows a third side view of the pump of the preferred water container; and, FIG. 8 shows a fourth side view of the pump of the preferred water container

DETAILED DESCRIPTION

The following description relates to a particular embodiment of the present invention, although it will be understood by the skilled person that alternatives to the following description are possible.

Figure 1:
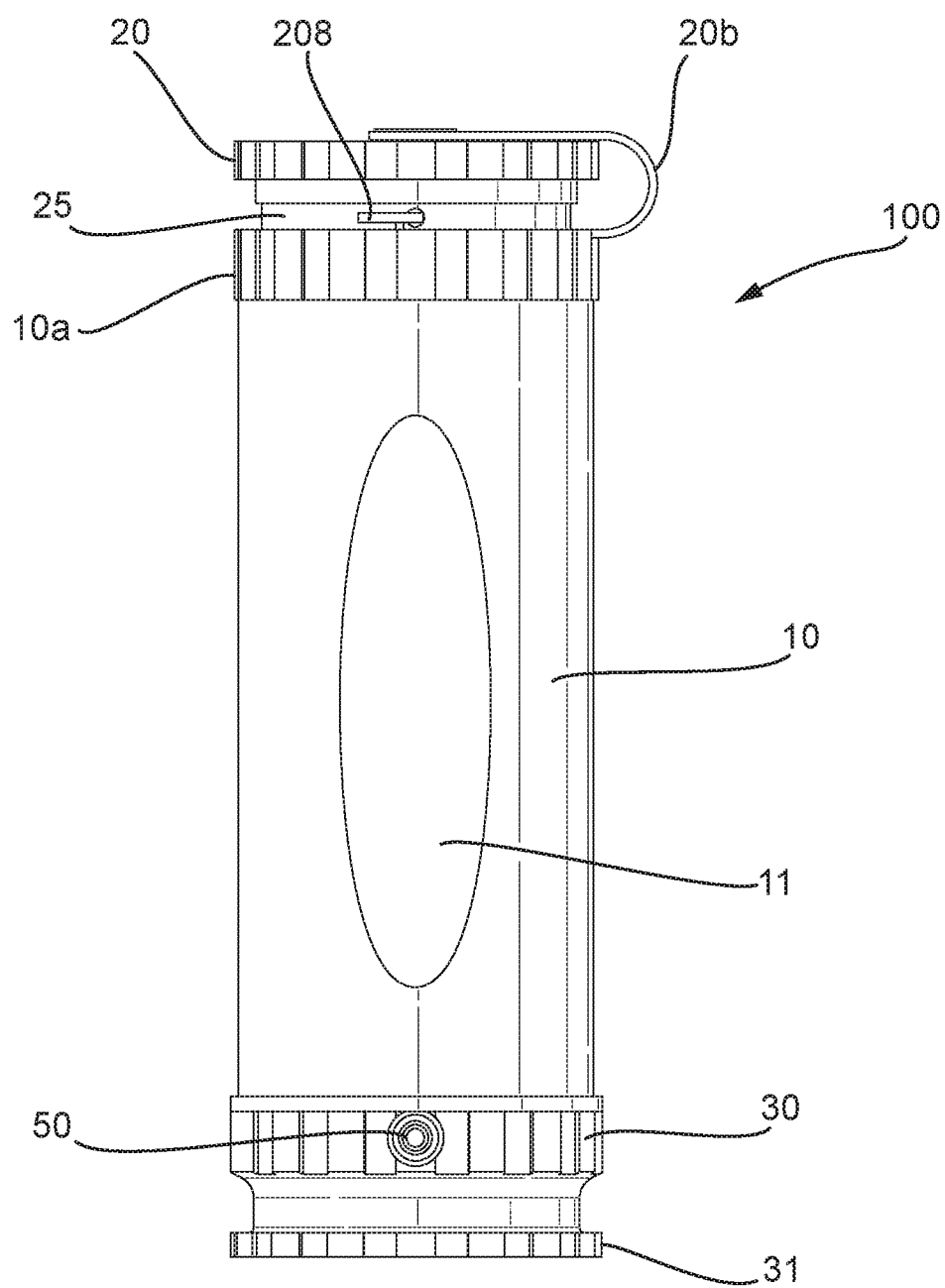
FIG. 1 shows a side view of a preferred water container.
Figure 2:
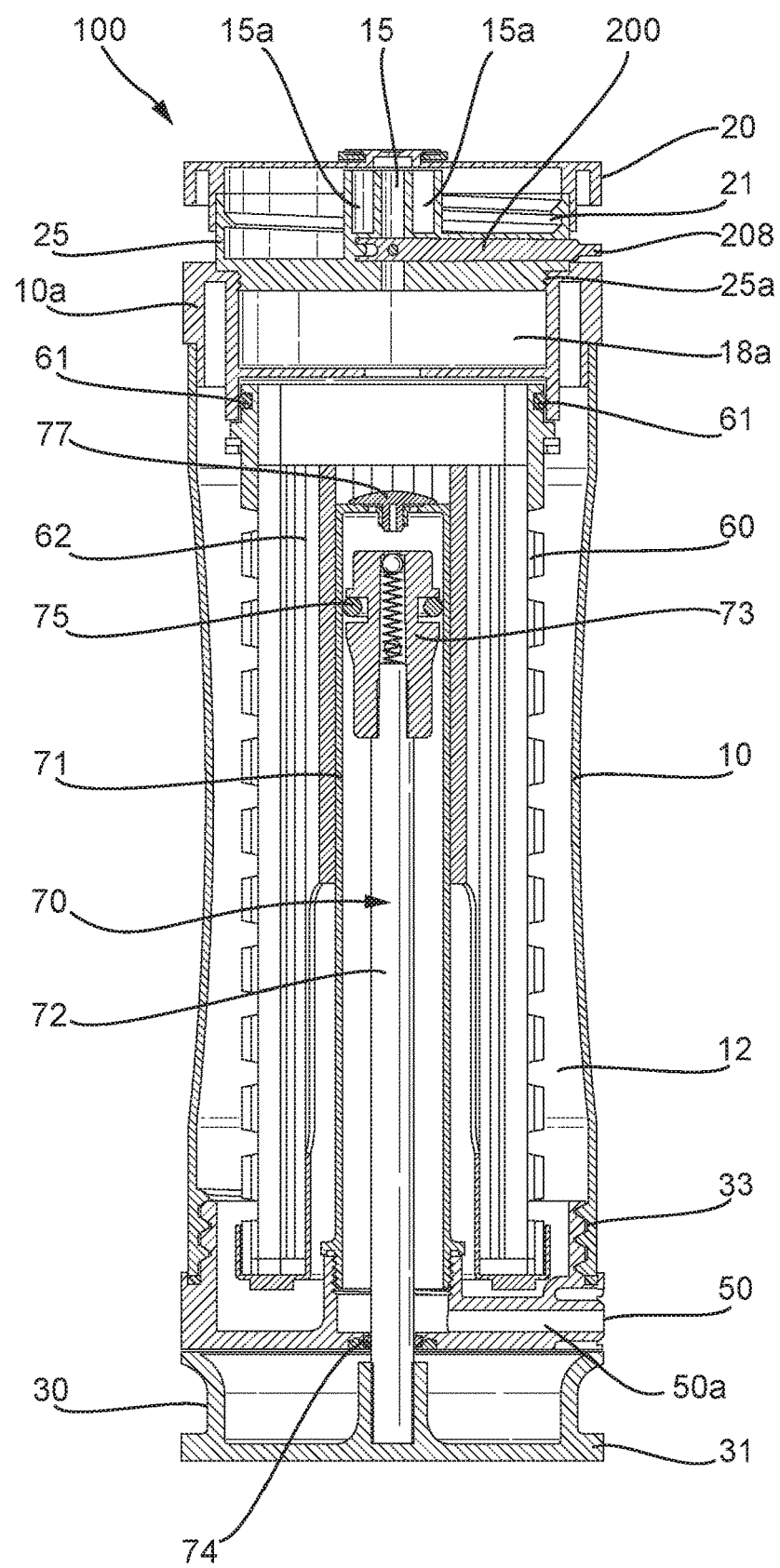
FIG. 2 shows a cross-sectional view of the preferred water container.
Figure 3:
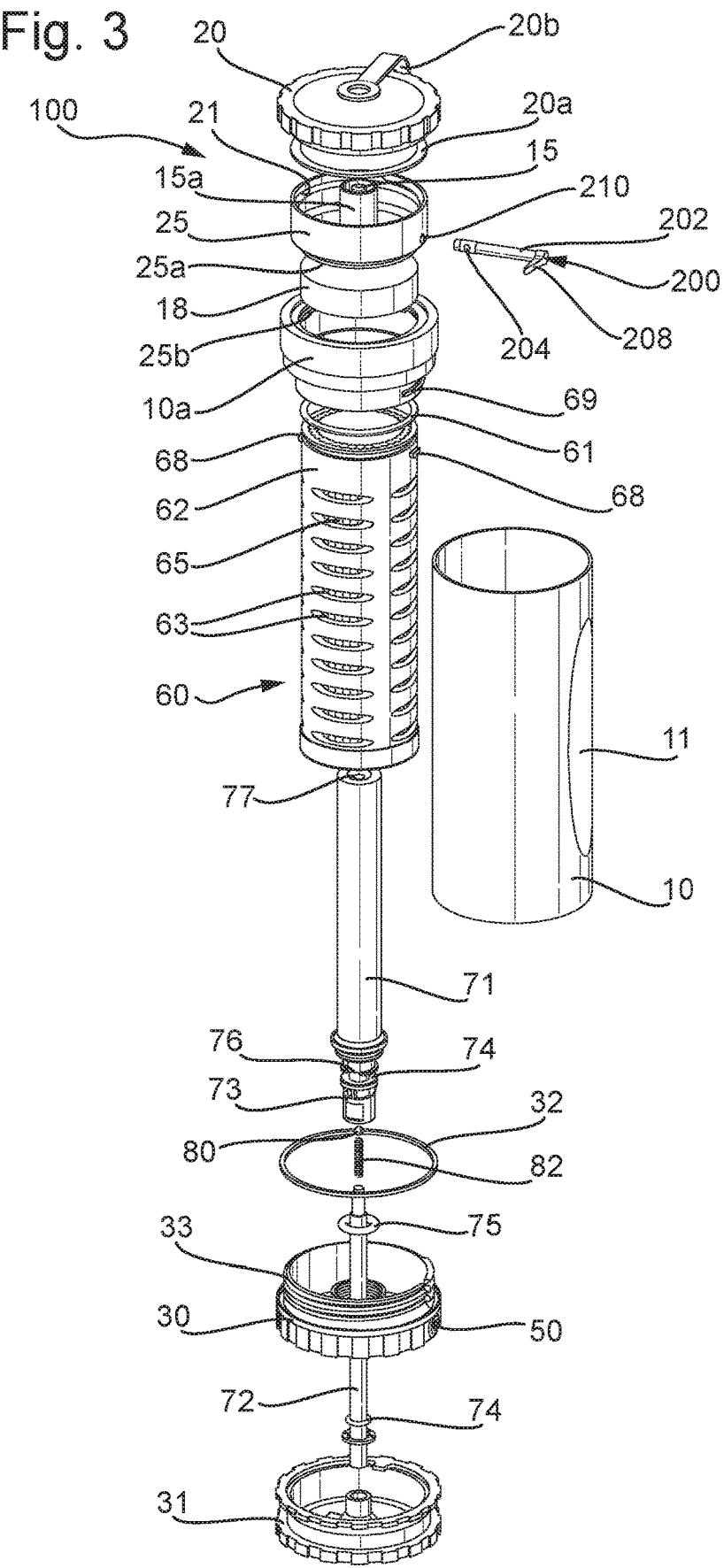
FIG. 3 shows partially disassembled perspective view of the preferred water container.

FIG. 1 shows a water container 100 in accordance with the present invention, FIG. 2 shows a cross-section through said water container and FIG. 3 is a partially disassembled perspective view showing the main constituent parts of the water container 100. A general overview of the water container will now be given with reference to FIGS. 1, 2 and 3.

The water container 100 comprises a substantially cylindrical hollow rigid outer housing 10 having an integrally formed lid 10a at one end and a removable base 30 at the other. The lid 10a is attached to a fastening member 25 which comprises a nozzle 15 integrally formed with it. Fastening member 25 comprises a screw thread 25a which allows it to be removably attached to lid 10a of the housing 10 by means of a corresponding thread 25b on the lid 10a. A substantially annular seal 20a acts as a seal between the fastening member 25 and lid 10a. The seal 20a is attached to a cap 20 through means of flexible strap 20b, and typically the seal 20a and strap 20b are formed as a single member. The cap 20 has a push fit interface with fastening member 25 through means of a friction based seal integrally moulded to the underside of the cap 20. Flexible strap 20b prevents a user from misplacing the cap 20 when it is removed from the fastening member 25, and also allows the container 100 to be easily carried or attached to a bag. The housing 10 has an indented portion 11 to aid a user in gripping the container, and also to provide enhanced structural rigidity, thereby resisting deformation of the housing when under load.

The base 30 is removably attachable to the housing 10 by means of a screw thread 33, and forms a water- and air-tight seal through by means of seal 32. The base 30 comprises a fluid inlet 50 which comprises a substantially circular orifice in the outer wall of the base 30. The fluid inlet is coupled to a piston shaft 71 of a pump 70 by means of fluid inlet pipe 50a. The pump 70 comprises a piston shaft 71, a piston head 73 which runs through the piston shaft, and a handle 31. The piston head 73 and the handle 31 are fixed relative to each other by a piston rod 72 such that movement of the handle is effective to move the piston head 73 within the piston shaft 71. The handle 31 is integrally formed with the base 30 but has a degree of freedom along the axis of the container 100 so as to move the piston head 73 through the piston shaft. The handle 31 may lock into the base 30 when not in use (for example, through appropriately designed protrusions from the handle into the base).

A non-return valve 77 is provided at a distal end of the pump 70 with respect to the handle, and the piston shaft 71 is sealed about the piston rod by seal 74 in order to generate a water- and air-tight seal at the piston shaft. The seal 74 is preferably a nitrile rubber O-ring seal. The pump in the present embodiment is a 1:1 pump, in that the pressure that the user must overcome to actuate the pump is equal to the pressure in the container. Nevertheless, it is possible to use ratcheting, or gearing, systems to allow easier hand actuation of the pump (and which would consequently enable the pressure inside the pump to be increased to a greater level than would otherwise be possible). The operation of the pump will be described in more detail with reference to FIGS. 5 to 8.

As seen in FIGS. 2 and 3, a filter cartridge 60 is disposed within the housing 10 of the container 100. The filter cartridge 60 abuts the base 30 and is attached to lid 10a of the housing through a bayonet locking action between flanges 68 positioned on an upper end of housing 62 of the filter cartridge 60 and receiving grooves 69 on lid 10a. A food grade seal 61 is provided such that the seal between the filter cartridge 60 and lid 10a is both water- and air tight. In the present embodiment, the filter cartridge 60 substantially surrounds the pump 70, and the pump 70, container housing 10 and filter cartridge 60 share a common axis. The filter cartridge 60 will be described in more detail with reference to FIG. 4.

A fluid reservoir 12 is defined by the housing 10 in the space between the filter 60, lid 10a and base 30. The fluid reservoir preferably has a volume of at least 300 ml, more preferably 450 ml.

As seen in FIG. 3, the water container 100 also incorporates an additional carbon filter 18 situated between filter cartridge 60 and the water outlet 15 such that water passes through the carbon filter 18 and leaves the water container through the water outlet 15. FIG. 2 does not show the carbon filter itself but the space in which it sits (18a) is clearly shown. Carbon filters are known to be effective in the removal of chemicals and heavy metal contaminants from water. Alternatively, or indeed additionally, different filters could be incorporated into the container 100. For example, resin filters are known as effective desalinisation filters. Filters of this or other types may be incorporated into the filter cartridge 60.

The carbon filter used in the preferred embodiment is an active carbon filter, although other types of carbon-based filters (such as charcoal filters) may be adopted.

Advantageously, the removal of the fastening member 25 allows a user access to the carbon filter (for example to change a used carbon filter) without having to remove the filter cartridge 60. This means that the carbon filter can be changed without the risk of contaminating the filter cartridge.

The nozzle 15 acts as a water outlet in that it allows filtered water to pass from the filter 60 out of the water container 100 when it is in an open position. The nozzle 15 also has a closed position in which water is not able to flow out of the end of the nozzle. In a preferred embodiment, the open and closed positions of the nozzle 15 are controlled by a tap member 200 integrated with fastening member 25 through an inlet 210 positioned in a side wall of the fastening member 25. The tap member comprises an elongate member 202 having a through-hole 204 at one end thereof. The length of the elongate member 202 is such that the through-hole 204 is situated at the same radial location as the nozzle 15 (typically the nozzle is positioned in the centre of the container when viewed in plan view, and therefore the length of the elongate member 202 is substantially equal to the radius of the container 100). When the through-hole 204 aligns with the axis of the nozzle 15, the nozzle is said to be in an open position, as fluid is able to flow through the nozzle through the through-hole 204 of the tap member 200. When the tap member is rotated such that the through-hole is not aligned with the axis of the nozzle 15 (typically such that the through-hole is perpendicular to the axis of the nozzle), the nozzle 15 is in the closed position as water is no longer able to flow through the nozzle. The rotation of the tap member is actuated by handle 208 which sits proud of the fastening member 25 (see FIG. 1). In this manner, the nozzle 15 and tap member 200 act together as a tap as understood by the skilled person.

Other means of actuating the open and closed positions of the nozzle 15 are envisaged however, for example a cap removably positioned over the end of the nozzle.

As clearly shown in FIG. 3, fastening member 25 further comprises an attachment structure 15a surrounding the nozzle 15. The attachment structure 15a has a substantially annular form and is coaxial with the nozzle 15, meaning that a hose can be attached with a good water-tight seal to the nozzle by placing the housing of the hose in the space defined between the nozzle 15 and the attachment structure 15a. Other means of forming a good attachment between the water outlet 15 and a hose are envisaged, however.

Figure 4:
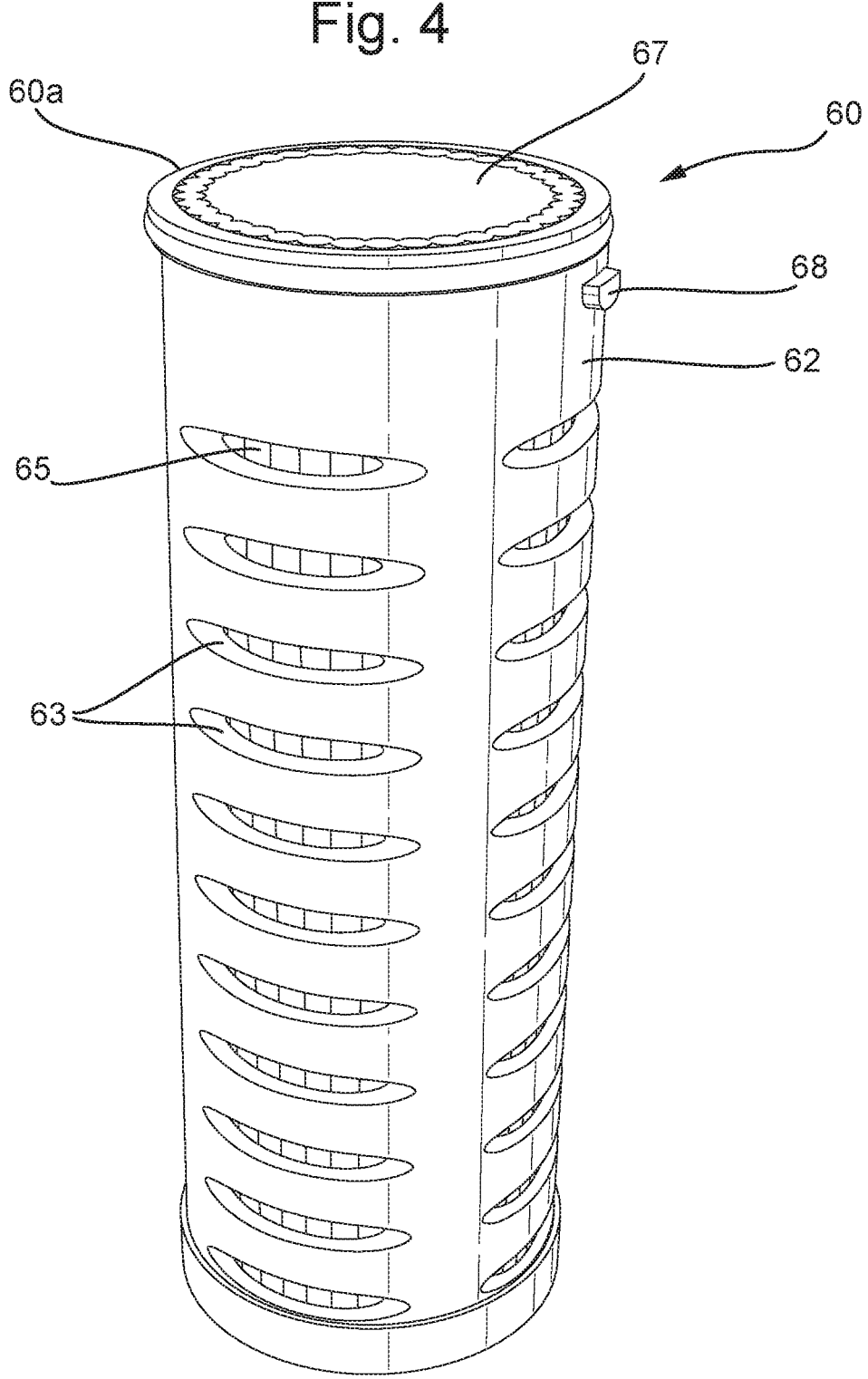
FIG. 4 shows a perspective view of a preferred water filter.

FIG. 4 shows the filter cartridge 60 of one preferred embodiment. As shown, the filter cartridge 60 comprises a substantially annular housing 62 in which a matrix of hollow fibre membranes 65 is disposed. The hollow fibre membranes 65 typically have a mean pore size which is capable of ultra-filtration. As such, the filter cartridge 60 is effective to remove, bacteria, viruses, cysts, parasites, fungi and all other water-borne pathogens. In fact, such a filter removes all microbiological matter from the water to provide safe drinking water.

The fibre membranes 65 are arranged in a substantially linear manner as shown in FIG. 4 and are potted within a resin layer 67 at an open end 60a proximal the nozzle 15, and sealed and capped at a distal end. The membranes are held together by strips of food-safe glue in order to form a cylinder of membranes, as seen in FIG. 4.

In preferred embodiments the openings in the membranes are smaller than 20 nm, and preferably smaller than 15 nm. This ensures that viruses as well as bacteria are filtered from the water. The preferred fibre membranes 65 have a retention of greater than 99.9999% of bacteria, 99.99% of cysts and 99.99% of viruses from the water. The fibre membranes also remove sediments and all other contaminants in suspension from the water.

The filter membranes are preferably hydrophilic, and as a result water (or any other liquid) passes through them in preference to air.

The outer wall of the housing 62 contains a number of holes 63, which allow dirty water to enter the fibre membranes 65 from the fluid reservoir 12.

The manual pump 70 provides the required pressure differential across the membrane walls to drive water from the fluid reservoir 12 through the walls of the hollow fibre membranes 65 and thereafter along the length of the fibre membranes to their open ends proximal the nozzle 15 when the nozzle is in its open position.

Fibre membranes suitable for use with the present invention are available commercially, for example from GE Power and Water may be used. The hollow ultra-filtration membranes are effective to screen all turbidity, bacteria and viruses.

The pump 70 will now be described in more detail with reference to FIGS. 5 to 8, which illustrate the action of the pump in drawing water from a water source 300, which could be a river or a lake for example. In FIGS. 5 to 8 only the main components of the pump 70 are shown for ease of illustration.

The pump head 73 comprises an annular groove 74 defining a first end stop 74a proximal the non-return valve 77 and a second end stop 74b distal from the non-return valve 77. An O-ring seal 75 is disposed with the groove 74 which is moveable between the first and second end stops. When the seal 75 abuts the first end stop 74a, a fluid path is defined past the piston head 73 through opposing cut-out portions in first end stop 74a. This is most clearly seen at 76 in FIG. 3. When the seal 75 abuts the second end stop 74b, the piston head substantially seals the piston shaft 71.

Figure 5:
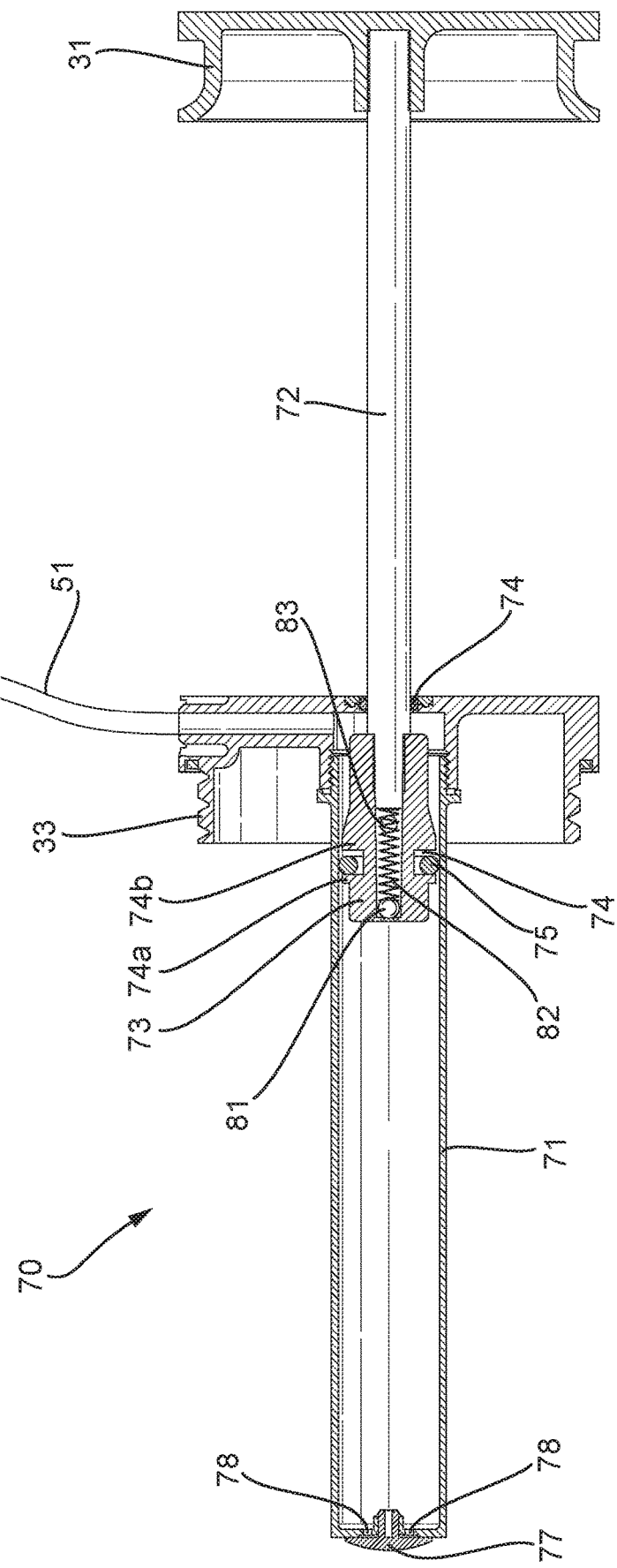
FIG. 5 shows a first side view of the pump of the preferred water container.

In use, a user may attach a scavenging hose 51 to fluid outlet 50 and place a distal end of the hose into a water source. In this manner, the fluid inlet 50 of the container 100 is in fluid communication with the water source. The pump cycle starts with the handle 31 in the withdrawn position as shown in FIG. 5.

Figure 6:
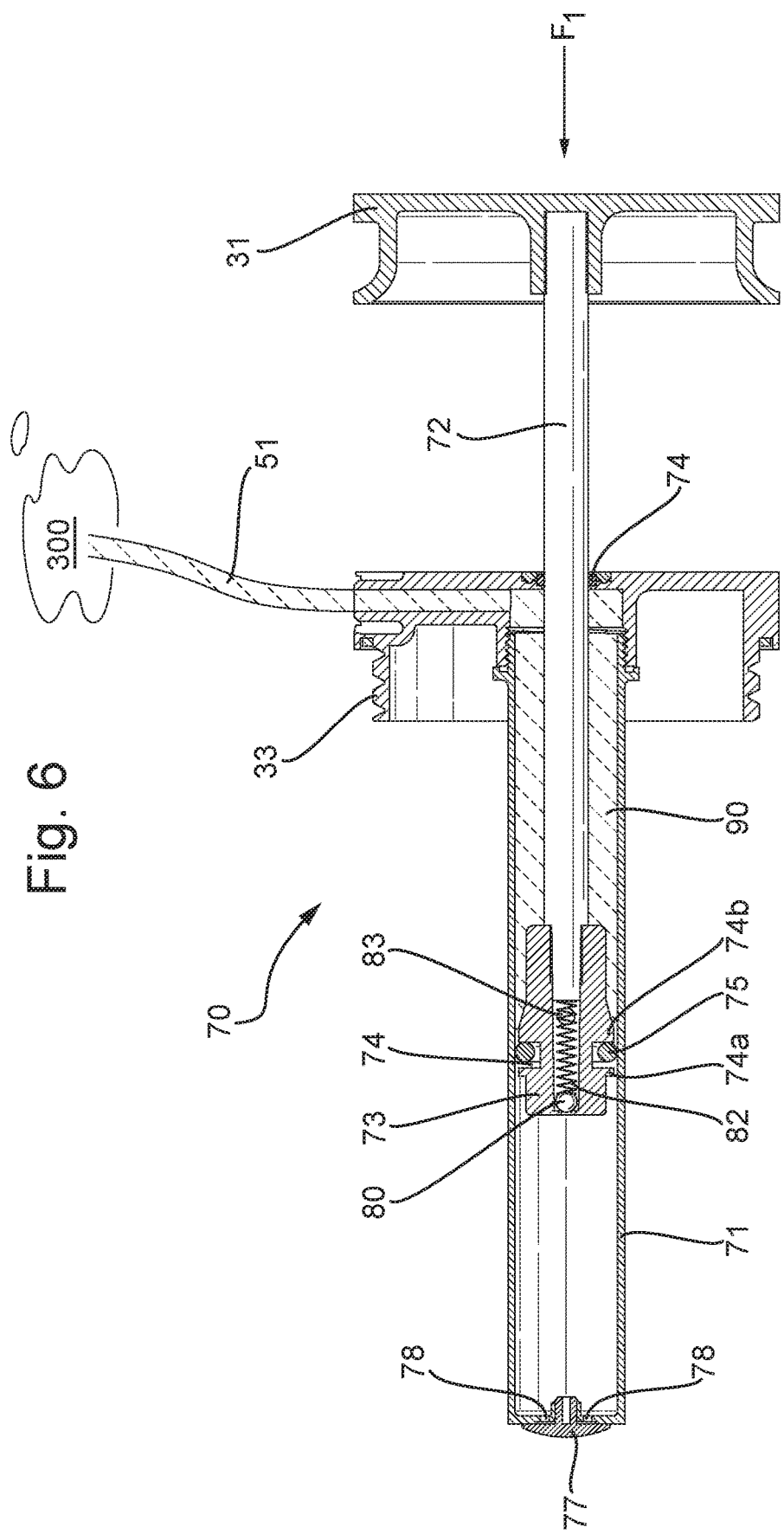
FIG. 6 shows a second side view of the pump of the preferred water container.

The user applies a closing force $F_1$ to the handle 31 as illustrated in FIG. 6. This causes piston head 73 to move along the piston shaft 71 due to the coupling between the handle 31 and piston head 73 by piston rod 72. The O-ring seal 75 is forced against the second end-stop 74b due to friction with it and the inner surface of the piston shaft 71 and is therefore in the sealed position. The low pressure region created behind the moving piston head 73 draws water from the water source 300 along the scavenging hose 51, through fluid inlet 50 and into the piston shaft 71. This is illustrated by the shading 90. The seal 74 between the piston shaft and the piston rod 72 ensures that only water (i.e. no air) is drawn into the piston chamber 71.

When the handle 31 is pushed into the closed position illustrated in FIG. 7, the piston shaft 71 is full of water as illustrated by the shading 90.

As shown in FIG. 8, when the user applies a withdrawing force $F_2$ to the handle 31, the O-ring seal 75 is moved, due to friction, against the first end-stop 74*a* and is therefore in an unsealed position which opens a fluid path past the piston head 73 through cut-out portions 76 in first end stop 74*a* as illustrated by the arrows in FIG. 8. Therefore, due to the presence of seal 74 preventing water being pushed out the end of the piston shaft 71, when the handle is withdrawn by the user applying withdrawing force $F_2$, water that had previously been drawn into the piston shaft 71 flows around the piston head and fills the region above the piston head between the piston head and the non-return valve. It has been found that the pressure of the body of water 300 is enough to prevent water flowing back out of the fluid inlet 50 when the handle 31 is withdrawn. Even so, it is envisaged that a non-return valve such as a duck-bill valve may be placed at the fluid inlet 50.

With the handle in the fully withdrawn position (as in FIG. 5), there is now a volume of water present in the region between the pump head 73 and the non-return valve 77. On the application of a further closing force by the user, the O-ring seal 75 is moved to its closed position, and therefore the water in the region between pump head 73 and non-return valve 77 is forced through the non-return valve and into the fluid reservoir 12. Due to the presence of air already in the fluid reservoir 12, the water pumped into the fluid reservoir 12 increases the pressure within the fluid reservoir 12.

Therefore, by repeated movement of the handle between a withdrawn position (as illustrated in FIG. 5) and a closed position (as illustrated in FIG. 7), water is pumped into the fluid reservoir.

If the scavenging hose is not placed in a water source and is open to air (or has been removed such that the fluid inlet 50 is in direct communication with air, as in FIGS. 1 to 3), the pump 70 works in the same manner in order to force air through the non-return valve and into the fluid reservoir 12.

The non-return valve 77 has a mushroom-like shape. When the pump head 73 is introduced to the pump shaft 71 the pressure in the pump shaft causes the lateral extremities of the non-return valve 77 to rise slightly, allowing water (or air) to enter the fluid reservoir 12 via voles 78 in the pump shaft. When the pump head 73 is retracted, the lateral extremities of the non-return valve retract back over the holes 78 to prevent water (or air) leaving the reservoir 12.

The pump 70 comprises a pressure regulation system disposed within a passageway of the pump head 73. A ball bearing 81 is biased towards the tip of the pump head 73 by a spring 82. When pressure is applied to the container housing 10, the ball bearing retracts down the passageway by a distance dependent on the applied pressure. If the pressure reaches a pre-determined maximum level then the ball bearing 81 may retract to such an extent that water (or air) may pass through an escape passageway 83 rather than being forced through the non-return valve 77, thereby preventing additional pressure being applied to the housing 10. The pressure required to retract the spring 82 will depend upon the length of the spring and the spring constant according to Hooke's Law. In this way, the maximum pressure that can be applied to the housing 10 is regulated.

We will now describe how the water container 100 may be used, firstly in a mode where it acts as a "straight-through" pump in order to fill a secondary container (not shown). Firstly, cap 20 is removed and the tap member 200 is rotated such that the nozzle 15 is in its open position. The water container 100 is then preferably attached to the secondary container such that water flowing out of the nozzle 15 enters the secondary container. This can either be done by attaching the screw thread 21 of the fastening member 25 to the corresponding thread on the secondary container (for example a wide mouth Nalgene® bottle), or attaching a hose to the attachment structure 15*a* as described above (for example for attaching to a flexible bladder acting as the secondary container).

Once the container 100 is attached to the secondary container, a scavenging hose (see for example FIGS. 5-8) is attached to the fluid inlet 50 and a distal end of the hose is introduced to a dirty water source, such as a river or a lake. Actuation of the pump by the user by repeated movement of the handle from a withdrawn position to a closed position then draws water into the fluid reservoir 12 as described above in relation to FIGS. 5 to 8. The introduction of water into the fluid reservoir 12 generates a sufficient pressure differential such that the dirty water from the fluid reservoir 12 is driven through the fibre membranes of the filter cartridge 60, through the carbon filter 18 and out of the nozzle 15 into the secondary container. In this manner, a user is able to use the water container 100 to continuously pump as much water as is required from a dirty water source into a secondary container. The water in the secondary container is filtered potable water. This is particularly beneficial if a user comes across a water source when out trekking for example, but does not know when he/she will find the next water supply. Using the water container 100, he/she is able to easily produce as much clean drinking water as he/she thinks is required.

The water container 100 may also be used as a storage device for dirty water which is able to be filtered and drunk by a user when required. In this mode, the tap member 200 is rotated such that the water outlet 15 is on the closed position. In the same manner as described above, a scavenging hose is attached the fluid inlet 50 and introduced to an unclean water source such as a river or lake. Actuation of the pump 70 draws water from the water source into the fluid reservoir 12. Filling the fluid reservoir 12 with water in this way pressurises the fluid reservoir 12 due to the presence of air already in the fluid reservoir 12 such that, when the nozzle 15 is changed to the open position (i.e. when the user wants a drink), there is a sufficient pressure differential to drive dirty water stored the reservoir 12 through the fibre membranes of the filter 60, through the carbon filter 18 and out of the nozzle 15.

However, if more pressure is required in order to activate this fluid path from the reservoir 12 to the nozzle through the filter 60, the pump 70 may be used to pump air into the fluid reservoir 12 with the nozzle closed in order to pressurise the reservoir 12 and generate the required pressure differential to drive the dirty water stored in the reservoir 12 through the filter 60. In order to pump air into the fluid reservoir 12, the scavenging hose is removed from the water source (and may be de-attached from the fluid inlet) such that the fluid inlet is in fluid communication with air rather than water. In such as case, actuation of the pump draws air into the fluid reservoir 12 as described above, thereby increasing the pressure within the fluid reservoir.

When the water container 100 is being used as a storage device, alternatively to pumping in water through the water inlet, the user may simply unscrew the base 30 of the container and introduce water directly to the fluid reservoir 12 (e.g. by pouring water in or "scooping" water from the water source) before replacing the base. In such a scenario, the pump 70 will then need to be used to pump air into the fluid reservoir 12 with the nozzle closed in order to generate enough pressure to drive water through the filter 60 and out of the nozzle 15.

It is to be noted that in both "modes" of the water container 100 described above (i.e. as a straight-through pump or as a storage container), a user may simply introduce the water inlet 50 to the water source (for example by holding the water inlet under water) rather than using a scavenging hose.

The water container is preferably made from plastic materials, and in particular water-grade acrylonitrile butadiene styrene (ABS) or polypropylene. Plastic containers could be made by techniques well known in the art, such as injection moulding, blow moulding or 3D printing. However, the container could be made from metal. Preferably the material in contact with filtered water contains an antimicrobial additive, such as that produced by SteriTouch®. The parts of the container in contact with filtered water include at least one of the nozzle 15, attachment structure 15a, tap member 200, cap 20, filter housing 62, resin layer 67 and fastening member 25.

The invention claimed is:

1. A water container comprising:
a fluid path defined by a fluid reservoir, a filter and a water outlet having an open position and a closed position;
a fluid inlet, and
a pump coupled to the fluid inlet, wherein the pump comprises:
a non-return valve, and
a piston shaft through which a piston head may be moved, the piston head being coupled to a piston rod slidably moveable through an orifice at a first end of the piston shaft,
wherein the orifice is sealed about the piston rod via a seal that is positioned at a bottom of the container and at an exit of the aperture in which the piston rod slides and is in sealing contact between the aperture and the piston rod such that, in use, operation of the pump pumps fluid from a fluid source in communication with the fluid inlet, through the non-return valve and into the fluid reservoir so as to pressurize the fluid reservoir such that, when the water outlet is in the open position, a pressure differential induces a flow of water along the fluid path through the filter to the water outlet, and
wherein the piston shaft is substantially surrounded by the filter, and
wherein the fluid inlet is arranged between the seal and the piston head.

2. The water container of claim 1, wherein the fluid reservoir has a storage capacity of at least 300 ml.

3. The water container of claim 2, wherein the storage capacity of the fluid reservoir is at least 450 ml.

4. The water container of claim 1, wherein the fluid inlet is located in a side wall of the water container.

5. The water container of claim 4, wherein the fluid inlet comprises an orifice located in a side wall of the water container.

6. The water container of claim 1, wherein the fluid inlet is attachable to a hose such that, in use, the fluid inlet is in communication with a fluid source via the hose.

7. The water container of claim 1, wherein the fluid reservoir comprises a removable base portion.

8. The water container of claim 1, wherein the filter comprises one or more membranes that are effective to pass water in preference to air under the influence of a pressure differential.

9. The water container of claim 8, wherein the one or more membranes comprise a plurality of pores having a mean size of less than 20 nanometers.

10. The water container of claim 9, wherein the plurality of pores have a mean size of less than 15 nanometers.

11. The water container of claim 1, wherein the filter comprises at least one hydrophilic capillary hollow fiber membrane.

12. The water container of claim 1, wherein the filter comprises a filter cartridge comprising a plurality of fiber membranes, and wherein the filter cartridge is removable from the water container.

13. The water container of claim 12, wherein the filter cartridge comprises an annular housing having an outer wall comprising a plurality of holes therethrough.

14. The water container of claim 13, wherein the fluid reservoir, the filter and the piston shaft are substantially cylindrical and are co-axial.

15. The water container of claim 12, wherein the plurality of fiber membranes comprise hollow fiber membranes.

16. The water container of claim 1, wherein the filter and the piston shaft are co-axial.

17. The water container of claim 1, further comprising a pressure regulator including a valve adapted to prevent the pressure in the fluid reservoir being raised above a predetermined level.

18. The water container of claim 1, wherein the fluid path comprises a secondary filter located between the filter and the water outlet, wherein the secondary filter is a carbon filter.

19. The water container of claim 18, wherein the secondary filter is removable.

20. The water container of claim 1, wherein at least one of the fluid reservoir and water outlet is made from plastic materials that include water-grade acrylonitrile butadiene styrene or polypropylene.

21. The water container of claim 1, wherein the water outlet comprises an anti-microbial additive.

22. A kit comprising a water container according to claim 1 and a hose attachable to the fluid inlet of the water container.

23. The water container of claim 1, wherein the fluid reservoir is a rigid fluid reservoir.

24. The water container of claim 1, wherein the fluid inlet is a water inlet.

* * * * *